(12) United States Patent
Karls et al.

(10) Patent No.: US 10,408,930 B2
(45) Date of Patent: Sep. 10, 2019

(54) BEAMFORMING TRAINING USING ECHOES OF AN OMNIDIRECTIONAL PULSE

(71) Applicant: INTEL CORPORATION, Santa Clara, CA (US)

(72) Inventors: Ingolf Karls, Feldkirchen (DE); Camila Priale Olivares, Neubiberg (DE)

(73) Assignee: Intel Corporation, Santa Clara, CA (US)

( * ) Notice: Subject to any disclaimer, the term of this patent is extended or adjusted under 35 U.S.C. 154(b) by 324 days.

(21) Appl. No.: 15/278,980

(22) Filed: Sep. 28, 2016

(65) Prior Publication Data

US 2018/0088225 A1 Mar. 29, 2018

(51) Int. Cl.
*G01S 13/42* (2006.01)
*G01S 13/28* (2006.01)
(Continued)

(52) U.S. Cl.
CPC ............ *G01S 13/42* (2013.01); *G01C 21/206* (2013.01); *G01S 5/02* (2013.01); *G01S 13/06* (2013.01); *G01S 13/08* (2013.01); *G01S 13/284* (2013.01); *G01S 13/48* (2013.01); *H01Q 3/00* (2013.01); *H01Q 21/205* (2013.01); *H04B 7/0617* (2013.01); *H04B 7/0639* (2013.01); *H04B 7/088* (2013.01); *H04W 4/02* (2013.01); *H04W 4/026* (2013.01); *H04W 28/18* (2013.01); *H04W 72/046* (2013.01); *G01S 2013/0236* (2013.01)

(58) Field of Classification Search
CPC ..... G01S 1/08; G01S 3/14; G01S 3/46; G01S 5/0009; G01S 5/0018; G01S 5/0054; G01S 13/42
See application file for complete search history.

(56) References Cited

U.S. PATENT DOCUMENTS 5,543,806 A * 8/1996 Wilkinson ........... H01Q 3/2605
 342/368
5,987,016 A * 11/1999 He ....................... H04B 1/7115
 370/335
(Continued)

FOREIGN PATENT DOCUMENTS

KR 101579705 B1 12/2015

OTHER PUBLICATIONS

Maltsev, Alexander et al. "Highly Directional Steerable Antennas." IEEE Vehicular Technology Magazine. Mar. 2016. pp. 32-39.
(Continued)

*Primary Examiner* — Peter M Bythrow
(74) *Attorney, Agent, or Firm* — Eschweiler & Potashnik, LLC

(57) ABSTRACT

Methods and devices for estimating an angle between a transmitter and a receiver for beamforming are provided. A method includes, with an antenna element in a first device, transmitting an omnidirectional pulse and detecting an echo of the pulse reflected from a second device. An angle between the first device and the second device is estimated based at least on a characteristic of the echo. The method includes transmitting the angle to the second device for use in beamforming between the first device and the second device.

20 Claims, 5 Drawing Sheets

(51) Int. Cl.

| | |
|---|---|
| G01C 21/20 | (2006.01) |
| G01S 5/02 | (2010.01) |
| G01S 13/06 | (2006.01) |
| G01S 13/08 | (2006.01) |
| G01S 13/48 | (2006.01) |
| H01Q 3/00 | (2006.01) |
| H01Q 21/20 | (2006.01) |
| H04B 7/06 | (2006.01) |
| H04B 7/08 | (2006.01) |
| H04W 4/02 | (2018.01) |
| H04W 28/18 | (2009.01) |
| H04W 72/04 | (2009.01) |
| G01S 13/02 | (2006.01) |

(56) References Cited

U.S. PATENT DOCUMENTS

| | | | | |
|---|---|---|---|---|
| 6,771,988 | B2* | 8/2004 | Matsuoka | H04B 7/0617 455/562.1 |
| 6,992,622 | B1* | 1/2006 | Chiang | H01Q 3/40 342/373 |
| 7,312,750 | B2* | 12/2007 | Mao | H01Q 3/2605 342/373 |
| 9,531,446 | B2* | 12/2016 | Sadeghi | H04W 16/28 |
| 2005/0048921 | A1* | 3/2005 | Chung | H01Q 1/241 455/63.4 |
| 2006/0111149 | A1* | 5/2006 | Chitrapu | H01Q 1/246 455/562.1 |
| 2007/0197229 | A1* | 8/2007 | Kalliola | H04W 4/029 455/456.1 |
| 2008/0311944 | A1* | 12/2008 | Hansen | G01S 1/02 455/517 |
| 2009/0233549 | A1* | 9/2009 | Maltsev | H01Q 3/26 455/41.2 |
| 2010/0164805 | A1* | 7/2010 | Niu | H01Q 1/125 342/377 |
| 2010/0203911 | A1* | 8/2010 | Cordeiro | H04W 72/0453 455/501 |
| 2010/0215027 | A1* | 8/2010 | Liu | H04B 7/0695 370/338 |
| 2014/0126620 | A1* | 5/2014 | Maltsev | H04B 7/0695 375/227 |
| 2014/0218236 | A1* | 8/2014 | Sadeghi | H04W 16/28 342/367 |
| 2015/0192656 | A1* | 7/2015 | Werner | G01S 3/46 342/352 |
| 2016/0007315 | A1* | 1/2016 | Lundgreen | G01S 3/46 455/67.11 |
| 2016/0103199 | A1* | 4/2016 | Rappaport | G01S 3/42 342/377 |

OTHER PUBLICATIONS

International Search Report and Written Opinion dated Nov. 20, 2017 in connectino with International Patent Application PCT/US2017/047102.

* cited by examiner

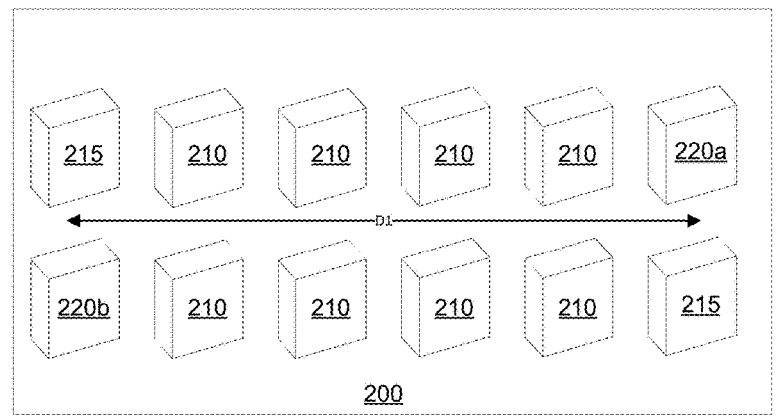
FIG. 2
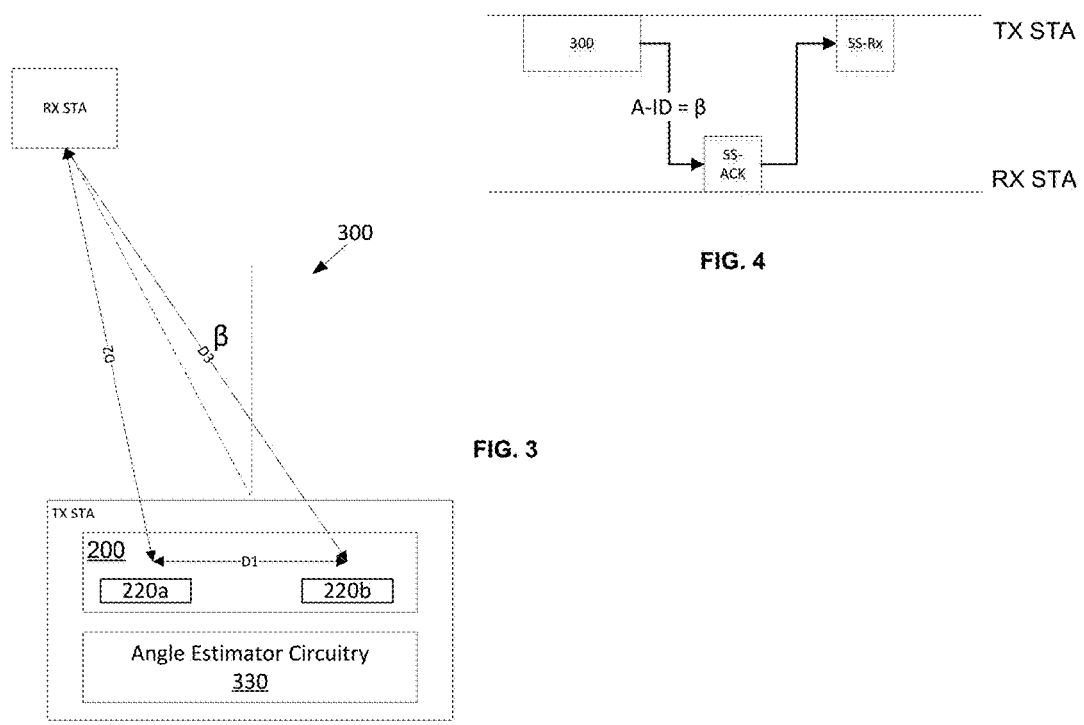
FIG. 4
FIG. 3

US 10,408,930 B2

BEAMFORMING TRAINING USING ECHOES OF AN OMNIDIRECTIONAL PULSE

FIELD

The present disclosure relates to the field of radio frequency (RF) transceiver antenna arrays and in particular to methods and apparatus for beamforming between directional wireless links.

BACKGROUND

Data throughput of multi-Gbps over wireless communication links together with substantially improved spectrum and energy efficiency have led to utilization of the radio spectrum above 6 GHz for indoor and outdoor applications in 5G cellular mobile systems, local multipoint distribution services, cellular backhaul and intra-cell communication systems. Due to the high path and penetration losses, in particular at frequency bands with millimeter wavelengths, antenna beamforming plays an important role in establishing and maintaining a robust communication link. To perform beamforming, the communicating transmitter, receiver, and transceiver determine and continuously maintain an optimal aligned pair of receive and transmit antenna sectors that optimize signal quality and throughput. Each determination of the optimal aligned pair of receive and transmit antenna sectors involves a process that can take several milliseconds.

BRIEF DESCRIPTION OF THE DRAWINGS

FIG. 2 illustrates schematically an exemplary modular antenna array with antenna elements.

FIG. 3 illustrates one exemplary transmitter and receiver angle estimation process, in accordance with various aspects described.

FIG. 4 illustrates an exemplary beamforming training process to determine an optimal aligned pair of receive and transmit antenna sectors for wireless communication links, in accordance with various aspects described.

DETAILED DESCRIPTION

Figure 1A:
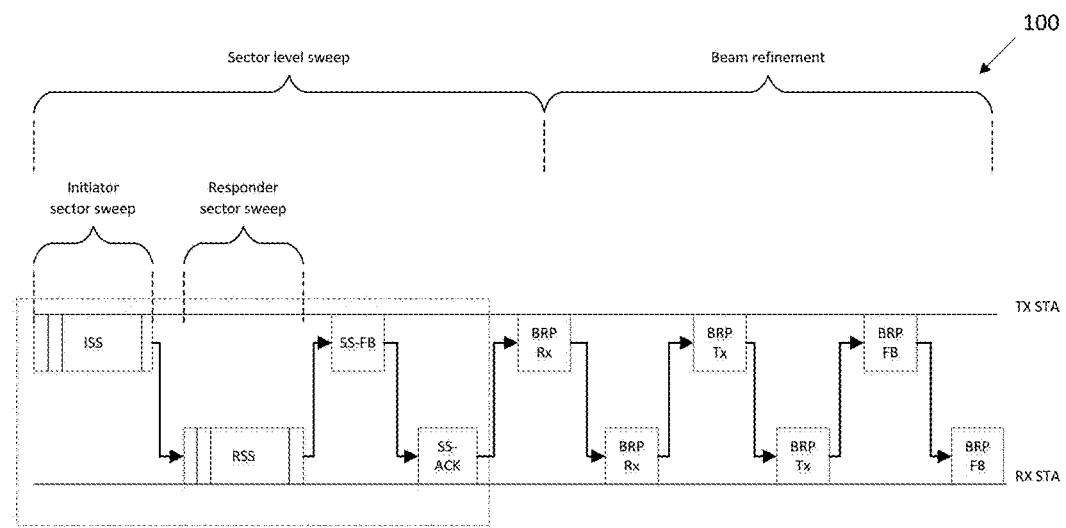
FIG. 1A illustrates an exemplary two-way beamforming training process to setup and refine an optimal aligned pair of receive and transmit antenna sectors for wireless communication links.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," "circuitry" and the like are intended to refer to a computer-related entity, hardware, software (e.g., in execution), and/or firmware. For example, a circuitry can be a circuit, a processor, a process running on a processor, a controller, an object, an executable, a program, a storage device, and/or a computer with a processing device.

FIG. 1A illustrates a beamforming training process 100 used to determine the optimal transmit and receive antenna sectors for wireless communication links as specified by IEEE 802.11ad. The beamforming training process includes two phases, a sector-level sweep (SLS) phase and a beam refinement phase (BRP). In the SLS phase the transmitter (TX STA) starts with an initial coarse-grain antenna sector sweep followed by a receiver (RX STA) initial coarse-grain antenna sector sweep in which the transmit antenna array and receive antenna array use pre-defined antenna beamforming patterns and avoid omnidirectional transmission by either the TX STA or the RX STA. The sweep leads to a first coarse-grain antenna sector configuration with a common TX and RX antenna pair. In the beam refinement phase this first identified sector pair is optionally used to fine-tune the TX and RX antenna arrays to select a beam pattern pair with finer beam widths. There may also be an optional beam tracking (BT) phase in which the beam is adjusted for channel dynamics during data transmission. In the BT phase training fields including the automatic gain control (AGC) are added to data packets. Within the AGC field the set of beam directions being trained are changed in a sequential manner for the RX antenna array to calculate an appropriate AGC gain.

Figure 1B:
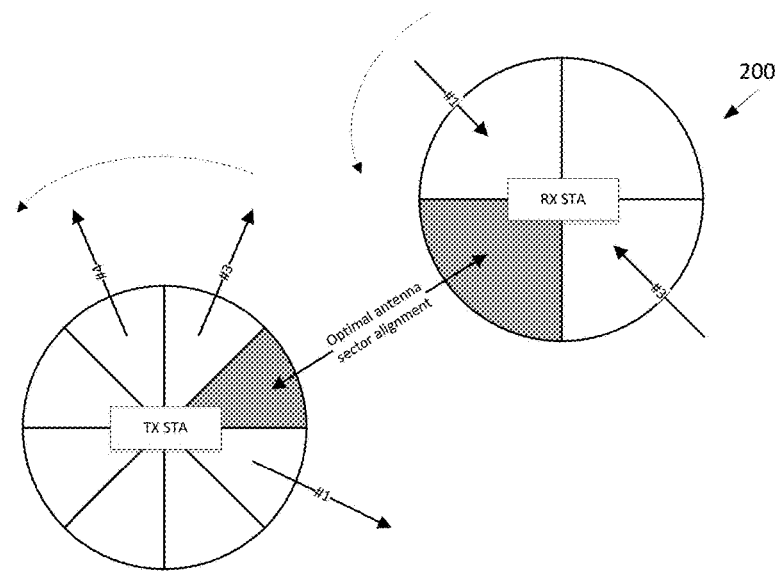
FIG. 1B illustrates an exemplary two-way transmit and receive sector sweep process for wireless communication links.

For the purposes of this description, the TX STA starts the beamforming training as the initiator and a mobile communication device (RX STA) is the responder. Of course, the role of initiator and responder may be switched. During the SLS phase, the TX STA sends training packets with a pre-defined antenna bandwidth and the RX STA remains in a quasi-omnidirectional mode. The RX STA measures the signal strength across all sectors and replies with the sector ID with a maximum received signal strength as sector sweep feedback (SS-FB). The SLS phase is illustrated schematically in FIG. 1B, in which eight different transmissions in eight different sectors are performed sequentially by the TX STA and the RX STA responds by identifying the one out of four sectors (e.g., sector #2) having the strongest receive signal.

The sector-level sweep phase incudes an initiator sector sweep (ISS), a responder sector sweep (RSS), sector sweep feedback (SS-FB), and sector sweep acknowledgment (SS-ACK) as in FIG. 1A. The ISS, RSS, and SS-FB are enclosed in a dashed box in FIG. 1A to indicate that those functions are replaced by the echo-based angle estimation that will be described herein. During the beam refinement phase (BRP) the TX STA and the RX STA iteratively refine the beams found during the sector-level sweep phase. High resolution beam pairs inside and around the best sector, which are identified during the SS phase, are tested and one beam pair is finally selected during the BRP.

After accomplishment of the SLS and BRP phases, the best refined beam pair is used for data transmission. Training sequences are appended additionally to payload data packets for channel estimation to adjust the channel variations after SLS phase and BRP in order to achieve beam tracking. The SLS phase and BRP are typically executed at the starting of the beamforming process. The data transfer interval (DTI) can be used for beamforming phases to enable reappearance of the beamforming on demand.

Beamforming for millimeter wave communications poses many challenges due to the large channel bandwidth, very dynamic channel characteristics, and hardware constraints. In particular, beamforming training and tracking accounting for TX STA and RX STA mobility rely on resource efficient schemes to accomplish line-of-sight (LOS) beam alignment and tracking under non-line-of-sight (NLOS) conditions. Therefore the beamforming training for directional wireless links should be done very quickly in particular when the mobile STA is moving directionally. Thus it would be advantageous to minimize the number of antenna sectors and the number of refined beams to be tested during the SLS and BRP in order to reduce beam training delay.

Current beam trainings take relatively long, ranging from single digit milliseconds up to hundreds of milliseconds. The latency (sum of time taken for SLS and BRP) is related to the number N of sectors served, the number M of beams per sector and the implemented search algorithm. The antenna beam width and the antenna gains are further constraints, where the antenna gain is limited during the beam training due to the tradeoff between time and beam resolution. Finally, beamforming training consumes substantial energy and processing resources, which are significant issues in devices operating at frequencies in millimeter wave bands where energy efficiency and latency are important issues.

The echo-based beamforming training described herein includes an echo-based angle estimation process for transmitters and receivers. In echo-based angle estimation, echoes of omnidirectional pulses transmitted by the TX STA (i.e., the initiator) are used to estimate the angle between the TX STA and the RX STA(s) (i.e., the responders). Thus echo-based angle estimation is performed in a manner in which the RX STA remains passive and does not transmit a responsive signal to the TX STA. The TX STA transmits omnidirectionally a pulse from one or more antenna elements and determines the angle between the TX STA and the RX STA based on an echo of the omnidirectional pulse that is reflected back from the RX STA. This use of a reflected pulse (hereinafter "echo") rather than a series of responsive communications from the RX STA significantly decreases the time for beamforming training and improves energy efficiency.

FIG. 2 illustrates, schematically, one embodiment of a modular antenna array 200 that is present in the transmitter station TX STA (e.g., a cellular communication tower, access point, and so on) and also in the receiver station RX STA (e.g. a mobile communication device such as a smartphone or laptop). The antenna array 200 shown in FIG. 2 is populated with 8 antenna elements 210 to be used for beamforming, two "dummy" or reserved antenna elements 215, and two isotropic or omnidirectional antenna elements 220a, 220b. Of course, any number of antenna elements 210, dummy antenna elements 215, omnidirectional antenna elements 220, or other types of antenna elements may be present in the modular antenna array, in other embodiments.

The antenna elements 210 are used to generate a directional antenna radiation patter used for directive transmit and receive, (i.e., beamforming). The directional antenna elements 210 are optimized to transmit and receive a focused, directed signal or beam. The dummy antenna elements 215 are optional antenna elements that may be provided for further sub-array extensions or other purposes. The omnidirectional antenna elements 220 are used to broadcast signals in all directions and to receive broadcast signals from all directions. Thus, the omnidirectional antenna elements 220a, 220b are optimized to transmit and receive undirected signals. As such, the omnidirectional antenna elements are better suited for transmitting omnidirectional pulses than are the directional antenna elements 210. The omnidirectional antenna elements 220 are often installed at the outer edges of the antenna array so they are relatively widely separated. The omnidirectional antenna elements 220a, 220b are spaced apart by a known distance D1. The omnidirectional antenna elements 220a, 220b and their relatively wide spacing are leveraged to perform echo-based beamforming training as will now be described.

FIG. 3 illustrates one embodiment of an echo-based angle estimation process 300 that is part of echo-based beamforming training process and replaces several time intensive operations in the SLS phase of traditional beamforming training (see dashed box in FIG. 1A). For the purposes of this description, the TX STA will be using echo-based angle estimation to determine or estimate the angle between the TX STA and the RX STA. However, in other embodiments, the RX STA may employ the same echo-based beamforming training techniques to determine an angle between the RX STA and the TX STA. In one embodiment, to estimate the angle $\beta$ between the TX STA and the RX STA, angle estimator circuitry 330, which is communicatively coupled to the antenna array 200, causes the two omnidirectional antenna elements 220a, 220b to transmit a omnidirectional pulse. The pulse is considered to be bi-static because two antenna elements simultaneously transmit the pulse. In other embodiments, only a single omnidirectional antenna element transmits a timely separated sequence of omnidirectional pulses when it can be assumed that the transmitter is moving sufficiently between the pulses.

For the purposes of this description, a pulse is a signal that has properties that enhance detection of reflections of the pulse by the transmitter of the pulse. Thus, a pulse can be distinguished from a communication signal that encodes some underlying data to be decoded by the receiver of the signal. Omnidirectional means that the signal is broadcasted in a wide range of directions, possibly all directions. An omnidirectional pulse may be optimized to travel a greater distance (e.g., have higher signal power) in all or most directions as compared to a directed signal having a known receiver.

Examples of omnidirectional pulses may include a variety of coded pulses. The omnidirectional pulse transmitted by the antenna elements 220a, 220b may be coded and compressed to overcome RX STA radar cross section and link budget issues. A coded pulse may encode some known information to enhance detection of the echo as amongst noise in a signal. Discrete coded waveforms may be used for the omnidirectional pulse because these waveforms improve range characteristics and detectability of the reflected pulse. For example, the pulse waveform may be coded either with unmodulated pulse-train codes (uniform and staggered) or phase modulated (binary or polyphaser) codes or frequency modulated codes.

The omnidirectional antenna elements 220a, 220b are configured to detect or receive an echo, or reflection, of the pulse from the RX STA as shown by the two arrows in FIG. 3. The angle estimator circuitry 330 is configured to distinguish an echo from an RX STA from echoes reflected from other sources such as buildings or hills. In one embodiment, the angle estimator circuitry 330 analyzes received echoes with matched filters to determine if the echo is from a communication device of some sort (e.g., RX STA). The echo is to be distinguished from a communication signal that is actively transmitted by the RX STA to the TX STA. The angle estimator circuitry 330 may use additional echo characteristics like Doppler to distinguish a RX STA from walls and other static objects. Furthermore, acknowledgement between the TX STA and the RX STA may be used to confirm that the echo was caused by the RX STA.

The echo is a reflection of the pulse and does not result from any responsive communication from the RX STA. The RX STA is completely passive because the echo is a reflection of the pulse from the RX STA and not a signal transmitted by the RX STA. Some characteristic of the echo is used by the angle estimator circuitry 330 to estimate the angle β. For example, in one embodiment the respective times it takes for the echo to reach the respective antenna elements is used to estimate the distance D2 between the first antenna element 220*a* and the RX STA as well as the distance D3 between the second antenna element 220*a* and the RX STA. The angle estimator circuitry 330 thus can solve for the angle β based on the three known sides D1, D2, D3 of a triangle.

FIG. 4 illustrates a portion of one embodiment of a beamforming training process that includes the echo-based angle estimation process 300. After estimating the angle based on the echo of the omnidirectional pulse, the TX STA transmits an angle identifier (A-ID) for the determined value of β to the RX STA. The RX STA sends an acknowledgement (SS-ACK) to the TX STA to confirm its receipt of the A-ID. At this point, after determining the angle in a single iteration and without doing sector sweeps and sector sweep feedback as illustrated in FIG. 1A, the TX STA and RX STA finalize the beamforming setup and refinement phase. While the beamforming training sequence outlined in FIG. 1A is in accordance with the IEEE 802.11ad framework, echo-based beamforming training outlined in FIG. 4 may be applied to any directional wireless technology that uses beamforming training and tracking.

Figure 5:
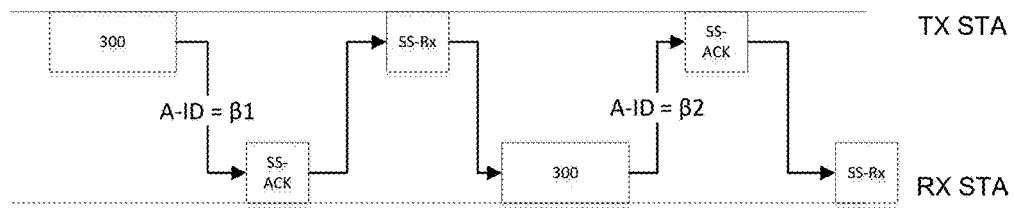
FIG. 5 illustrates another exemplary beamforming training process to refine the optimal aligned pair of receive and transmit antenna sectors for wireless communication links, in accordance with various aspects described.
Figure 6:
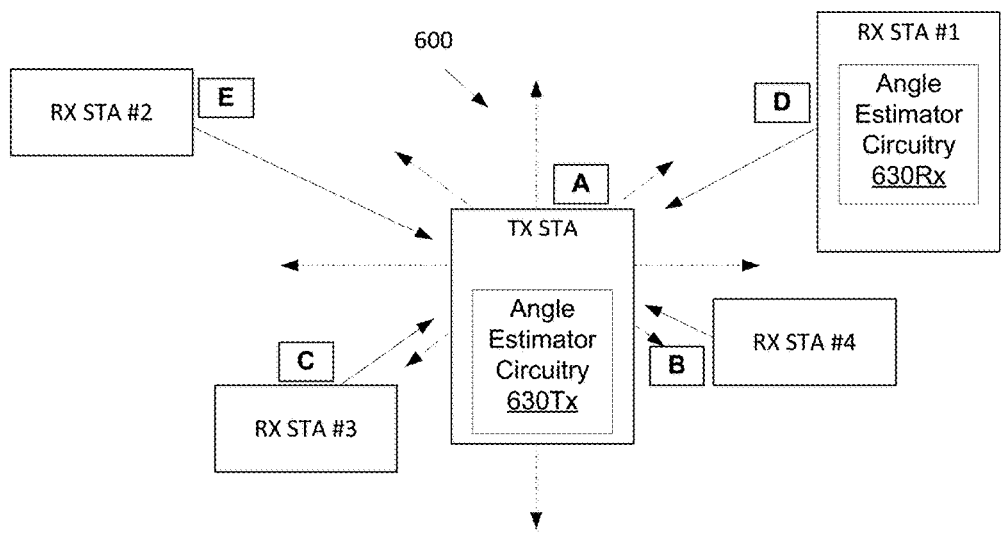
FIG. 6 illustrates an exemplary beamforming training process to determine an optimal aligned pair of receive and transmit antenna sectors for multiple wireless communication links, in accordance with various aspects described.

FIG. 5 illustrates one embodiment of echo-based beamforming training 500 in which the RX STA also performs echo-based angle estimation 300 by transmitting a pulse, detecting an echo reflected by the TX STA, and estimating the angle based on the echo. The RX STA transmits an A-ID for the angle between the RX STA and the TX STA to the TX STA. The echo-based beamforming training process 500 may be performed when the RX STA fails to acknowledge receipt of the A-ID from the TX STA or when a higher resolution angle value is desired. As shown in FIG. 6, in this embodiment the RX STA is also equipped with an angle estimator circuitry 630Rx that performs the same functions as the angle estimator circuitry 330 of FIGS. 3 and 630Tx, possibly in response to a signal from the angle estimator circuitry 630Tx.

FIG. 6 illustrates one embodiment of an echo-based beamforming training process 600 in which the angle estimator circuitry 630Tx estimates the angle between the TX STA and four different RX STAs. Of course, angles may be estimated for as many RX STAs as are detectable to the TX STA. At A, the angle estimator circuitry 630Tx causes omnidirectional antenna elements (not shown, see FIG. 2) to transmit an omnidirectional pulse. At B the antenna element detects an echo of the pulse that reflected off RX STA #4. Angle estimator circuitry 630Tx estimates an angle between the TX STA and the RX STA #4 and transmits an A-ID to RX STA #4 so that the beam setup and refinement phase may begin. At C the antenna element detects the echo of the pulse that reflected off RX STA #3. Angle estimator circuitry 630Tx estimates an angle between the TX STA and the RX STA #3 and transmits an A-ID to RX STA #3 so that the beam setup and refinement phase may begin. This process continues with echoes being received in ascending order of distance. Thus, a single omnidirectional pulse may be used to estimate the angle between the TX STA and any number of RX STAs.

Figure 7:
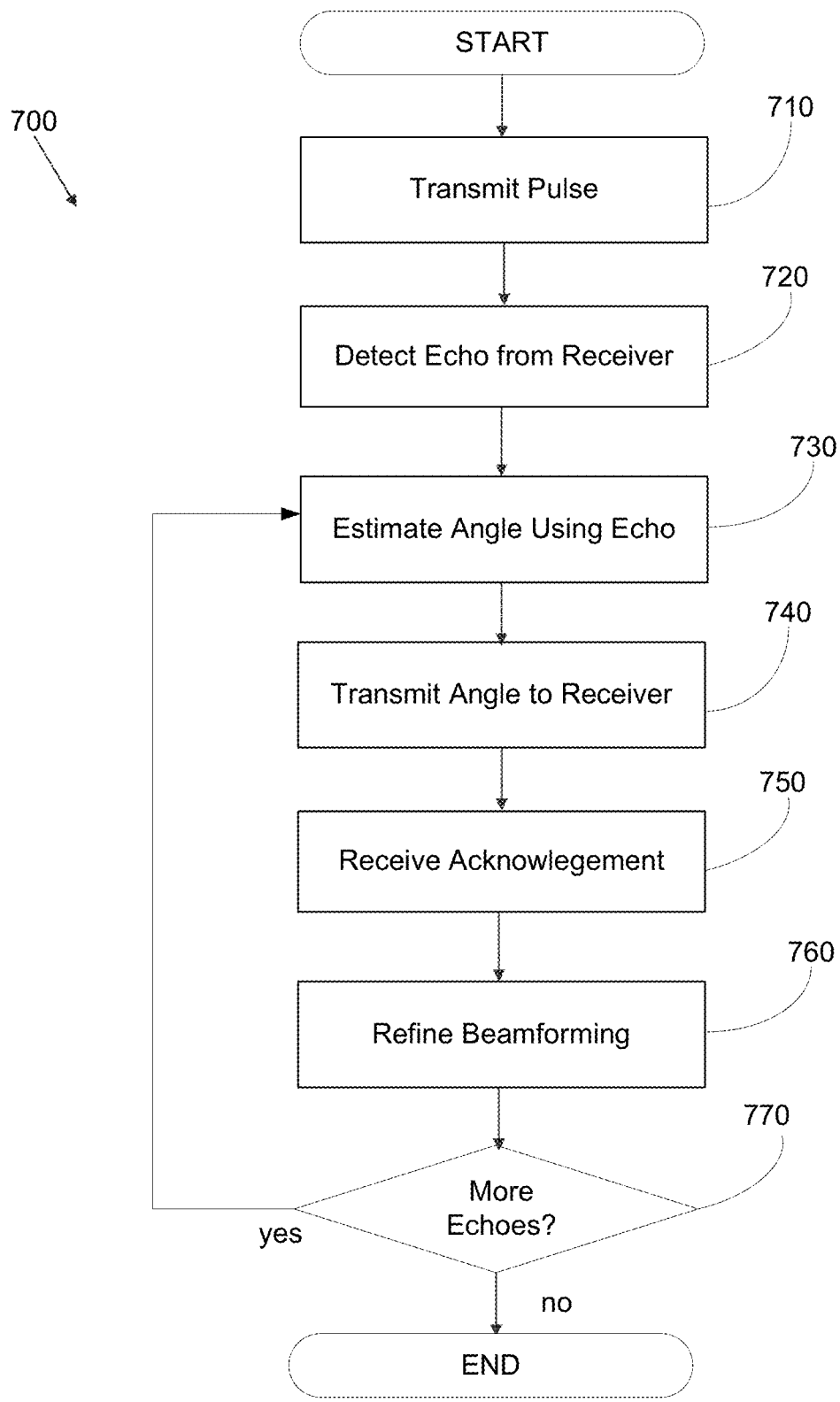
FIG. 7 illustrates a flow diagram outlining an exemplary method for beamforming training to determine an optimal aligned pair of receive and transmit antenna sectors, in accordance with various aspects described.

FIG. 7 illustrates a flow diagram 700 that outlines one embodiment of a method configured to perform echo-based beamforming training. The method 700 may be performed by a first device that includes the angle estimator circuitry 330 of FIG. 3 and/or 630Tx, 630Rx of FIG. 6. The method includes, at 710, transmitting an omnidirectional pulse. At 720, an echo of the pulse reflected from a second device is detected. At 730, an angle between the first device and the second device is estimated based on the echo. At 740, the angle (e.g., A-ID) is transmitted to the first receiver for use in beamforming setup and refinement with the first receiver. Optionally, at 750, acknowledgement of the angle is received from the first receiver and in response to receiving the acknowledgement, at 760 the beam setup and refinement phase is entered with the first receiver. At 770, a determination is made as to whether or not another echo has been detected from a third device. If not, the method ends. If so, the method returns to 730 and an angle between the third device and the first device is estimated. In one embodiment, angle estimator circuitry comprises computer-executable instructions stored on a computer readable medium that, when executed by a computer associated with a TX STA, cause the computer to perform the method 700 and/or any other functions, operations, or processes described with reference to FIGS. 2-7.

It can be seen from the foregoing description that while current techniques for beam search and tracking are based on an active TX STA and an active RX STA iteratively searching first for a sector and then for a beam while transmitting signals to one another, the echo-based beamforming training techniques described herein utilize a single active TX STA, without requiring any responsive transmission by the RX STA, to determine the angle between the TX STA and the RX STA in a single step. This significantly decreases the delay for beamforming training and tracking from milliseconds to microseconds, allowing beamforming training to be performed in very dynamic scenarios. Further, the echo-based beamforming training techniques described herein improve the energy efficiency because the angle determination efficiently utilizes processing power to determine the angle in a single iteration or calculation rather than scanning and transmitting and receiving training based packets.

Figure 8:
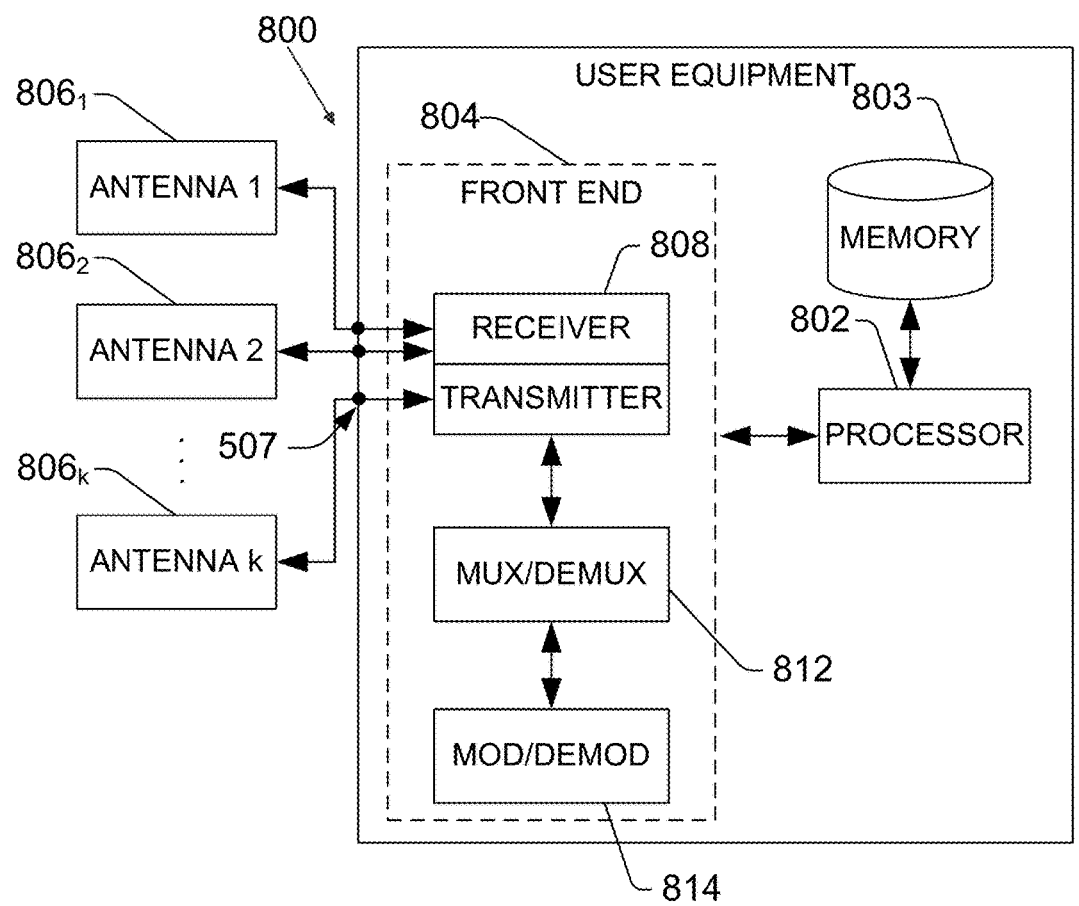
FIG. 8 illustrates an example user equipment device that is configured to perform angle estimation in accordance with various aspects described.

To provide further context for various aspects of the disclosed subject matter, FIG. 8 illustrates a block diagram of an embodiment of user equipment 800 (e.g., a mobile device, communication device, personal digital assistant, etc.) related to access of a network (e.g., base station, wireless access point, femtocell access point, and so forth) that can enable and/or exploit features or aspects of the disclosed aspects.

The user equipment or mobile communication device 800 can be utilized with one or more aspects of the echo-based beamforming techniques described herein according to various aspects. The user equipment device 800, for example, comprises a digital baseband processor 802 that can be coupled to a data store or memory 803, a front end 804 (e.g., an RF front end, an acoustic front end, or the other like front end) and a plurality of antenna ports 807 for connecting to a plurality of antennas 806$_1$ to 806$_k$ (k being a positive integer). The antennas 706$_1$ to 706$_k$ can receive and transmit signals to and from one or more wireless devices such as access points, receive and detect echoes in a signal, access terminals, wireless ports, routers and so forth, which can operate within a radio access network or other communication network generated via a network device (not shown).

The user equipment 800 can be a radio frequency (RF) device for communicating RF signals, an acoustic device for communicating acoustic signals, or any other signal communication device, such as a computer, a personal digital assistant, a mobile phone or smart phone, a tablet PC, a modem, a notebook, a router, a switch, a repeater, a PC, network device, base station or a like device that can operate to communicate with a network or other device according to one or more different communication protocols or standards.

The front end 804 can include a communication platform, which comprises electronic components and associated circuitry that provide for processing, manipulation or shaping of the received or transmitted signals via one or more receivers or transmitters (e.g. transceivers) 808, a mux/demux component 812, and a mod/demod component 814. The front end 804 is coupled to the digital baseband processor 802 and the set of antenna ports 807, in which the set of antennas 8061 to 806k can be part of the front end. In one aspect, the user equipment device 800 can comprise a phase locked loop system 810.

The processor 802 can confer functionality, at least in part, to substantially any electronic component within the mobile communication device 800, in accordance with aspects of the disclosure. As an example, the processor 800 can be configured to execute, at least in part, executable instructions that estimate the angle between a TX STA and a RX STA. Thus the processor 700 may embody various aspects of the angle estimator circuitry 330 of FIG. 3 and/or 630Rx, 630Tx of FIG. 6.

The processor 802 is functionally and/or communicatively coupled (e.g., through a memory bus) to memory 803 in order to store or retrieve information necessary to operate and confer functionality, at least in part, to communication platform or front end 804.

The processor 802 can operate to enable the mobile communication device 800 to process data (e.g., symbols, bits, or chips) for multiplexing/demultiplexing with the mux/demux component 812, or modulation/demodulation via the mod/demod component 814, such as implementing direct and inverse fast Fourier transforms, selection of modulation rates, selection of data packet formats, inter-packet times, etc. Memory 803 can store data structures (e.g., metadata), code structure(s) (e.g., modules, objects, classes, procedures, or the like) or instructions, network or device information such as policies and specifications, attachment protocols, code sequences for scrambling, spreading and pilot (e.g., reference signal(s)) transmission, frequency offsets, cell IDs, and other data for detecting and identifying various characteristics related to RF input signals, a power output or other signal components during power generation. Memory 803 may include a static random access memory (SRAM) that stores angle identifiers mapped to RX STAs with which the user equipment 800 is communicating.

Examples herein can include subject matter such as a method, means for performing acts or blocks of the method, at least one machine-readable medium including executable instructions that, when performed by a machine (e.g., a processor with memory or the like) cause the machine to perform acts of the method or of an apparatus or system for concurrent communication using multiple communication technologies according to embodiments and examples described.

Example 1 is a device that includes a first antenna element. The device is adapted for beamforming used in mobile communication and also includes angle estimator circuitry. The angle estimator circuitry is configured to cause the first antenna element to transmit an omnidirectional pulse; cause the first antenna element to detect an echo of the transmitted pulse reflected from a second device; estimate an angle between the device and the second device based at least on a characteristic of the echo; and cause the device to provide the angle to the second device for use in beamforming between the first device and the second device.

Example 2 includes the subject matter of example 1, including or omitting optional elements, wherein the omnidirectional pulse comprises discrete coded waveforms.

Example 3 includes the subject matter of example 1, including or omitting optional elements, further including a second antenna element to be disposed a first distance from the first antenna element. The angle estimator circuitry is further configured to: cause the second antenna element to transmit the omnidirectional pulse simultaneously with the first antenna element; cause the second antenna element to detect the echo; estimate a second distance between the first antenna element and the second device; estimate a third distance between the second antenna element and the second device; and estimate the angle based on the first distance, the second distance, and the third distance.

Example 4 includes the subject matter of examples 1-3, including or omitting optional elements, wherein the angle estimator circuitry is configured to detect the echo based on reflection characteristics in a detected signal that indicate that the signal comprises an echo that is reflected from a communication device.

Example 5 includes the subject matter of examples 1-3, including or omitting optional elements, wherein the angle estimator circuitry is configured to cause another angle estimator circuitry associated with the second device to: cause an antenna element in the second device to transmit a second omnidirectional pulse; cause the antenna element in the second device to detect a second echo of the second pulse reflected from the device; estimate an angle between the device and the second device based at least on a characteristic of the second echo; and cause the second device to transmit the angle to the device for use in beamforming between the device and the second device.

Example 6 includes the subject matter of examples 1-3, including or omitting optional elements, wherein the angle estimator circuitry is configured to: cause the first antenna element to detect a subsequent echo of the pulse reflected from a third device; estimate an angle between the device and the third device based at least on a characteristic of the subsequent echo; and cause the device to transmit the angle to the third device for use in beamforming communications with the third device.

Example 7 is a method, including transmitting an omnidirectional pulse and detecting an echo of the transmitted pulse reflected from a second device with a first antenna element in a device. The method includes estimating an angle between the first device and the second device based at least on a characteristic of the echo and providing the angle to the second device for use in beamforming between the first device and the second device.

Example 8 includes the subject matter of example 7, including or omitting optional elements, wherein the omnidirectional pulse comprises discrete coded waveforms transmitted by the first antenna element.

Example 9 includes the subject matter of example 7, including or omitting optional elements, further including transmitting the omnidirectional pulse simultaneously with the first antenna element and detecting the echo with a second antenna element to be spaced apart from the first antenna element by a first distance. The method includes estimating a second distance between the first antenna element and the second device; estimating a third distance between the second antenna element and the second device; and estimating the angle based on the first distance, the second distance, and the third distance.

Example 10 includes the subject matter of examples 7-9, including or omitting optional elements, including detecting the echo based on Doppler characteristics in a detected signal that indicate that the detected signal comprises an echo that is reflected from a communication device.

Example 10 includes the subject matter of examples 7-9, including or omitting optional elements, including receiving an acknowledgement signal from the second device indicating that the detected echo is reflected from the second device.

Example 12 includes the subject matter of examples 7-9, including or omitting optional elements, further including causing an antenna element in the second device to transmit a second omnidirectional pulse; causing the antenna element in the second device to detect a second echo of the second pulse reflected from the device; estimating an angle between the device and the second device based at least on a characteristic of the second echo; and causing the second device to transmit the angle to the device for use in beamforming between the device and the second device.

Example 13 includes the subject matter of examples 7-9, including or omitting optional elements, including detecting a subsequent echo of the pulse reflected from a third device; estimating an angle between the device and the third device based at least on a characteristic of the subsequent echo; and transmitting the angle to the third device for use in beamforming communications with the third device.

Example 14 is computer-readable medium having computer-executable instructions stored thereon that, when executed by a computer, cause the computer to: cause a first antenna element to transmit an omnidirectional pulse; cause the first antenna element to detect an echo of the pulse reflected from a second device; estimate an angle between the device and the second device based at least on a characteristic of the echo; and cause the device to transmit the angle to the second device for use in beamforming between the first device and the second device.

Example 15 includes the subject matter of example 14, including or omitting optional elements, wherein the omnidirectional pulse comprises discrete coded waveforms transmitted by the first antenna element.

Example 16 includes the subject matter of example 14, including or omitting optional elements, wherein the instructions further comprise instructions configured to cause the computer to: cause a second antenna element to transmit the omnidirectional pulse simultaneously with the first antenna element; cause the second antenna element to detect the echo; estimate a second distance between the first antenna element and the second device; estimate a third distance between the second antenna element and the second device; and estimate the angle based on the first distance, the second distance, and the third distance.

Example 17 includes the subject matter of examples 14-16, including or omitting optional elements, wherein the instructions further comprise instructions configured to cause the computer to detect the echo based on reflection characteristics in a detected signal that indicate that the signal comprises an echo that is reflected from a communication device.

Example 18 includes the subject matter of examples 14-16, including or omitting optional elements, wherein the instructions further comprise instructions configured to cause the computer to cause another computer associated with the second device to cause an antenna element in the second device to transmit a second omnidirectional pulse; cause the antenna element in the second device to detect a second echo of the second pulse reflected from the device; estimate an angle between the device and the second device based at least on a characteristic of the second echo; and cause the second device to transmit the angle to the device for use in beamforming between the device and the second device.

Example 19 includes the subject matter of examples 14-16, including or omitting optional elements, wherein the instructions further comprise instructions configured to cause the computer to cause the first antenna element to detect a subsequent echo of the pulse reflected from a third device; estimate an angle between the device and the third device based at least on a characteristic of the subsequent echo; and cause the device to transmit the angle to the third device for use in beamforming communications with the third device.

Example 20 includes the subject matter of examples 14-16, including or omitting optional elements, wherein the instructions further comprise instructions configured to cause the computer to detect the echo based on Doppler characteristics in a detected signal that indicate that the detected signal comprises an echo that is reflected from a communication device.

Example 21 is computer-readable medium having computer-executable instructions stored thereon that, when executed by a computer, cause the computer to perform the method of any one of the examples 7-13.

Example 22 is an apparatus, including: means for causing an antenna element in a first device to transmit an omnidirectional pulse and detect an echo of the pulse reflected from a second device. The apparatus also includes means for estimating an angle between the first device and the second device based at least on a characteristic of the echo and means for transmitting the angle to the second device for use in beamforming between the first device and the second device.

Example 23 includes the subject matter of example 22, including or omitting optional elements, including means for causing a second antenna element that is spaced apart from the first antenna element by a first distance to transmit the omnidirectional pulse simultaneously with the first antenna element and detect the echo. The apparatus includes means for estimating a second distance between the first antenna element and the second device; means for estimating a third distance between the second antenna element and the second device; and means for estimating the angle based on the first distance, the second distance, and the third distance.

It is to be understood that aspects described herein may be implemented by hardware, software, firmware, or any combination thereof. When implemented in software, functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer.

Various illustrative logics, logical blocks, modules, circuitry and circuits described in connection with aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor may be a microprocessor, but, in the alternative, processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration. Additionally, at least one processor may comprise one or more modules operable to perform one or more of the acts and/or actions described herein.

For a software implementation, techniques described herein may be implemented with modules (e.g., procedures, functions, and so on) that perform functions described herein. Software codes may be stored in memory units and executed by processors. Memory unit may be implemented within processor or external to processor, in which case memory unit can be communicatively coupled to processor through various means as is known in the art. Further, at least one processor may include one or more modules operable to perform functions described herein.

Further, the acts and/or actions of a method or algorithm described in connection with aspects disclosed herein may be embodied directly in hardware, in a software module executed by a processor, or a combination thereof. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to processor, such that processor can read information from, and write information to, storage medium. In the alternative, storage medium may be integral to processor. Further, in some aspects, processor and storage medium may reside in an ASIC. Additionally, ASIC may reside in a user terminal. In the alternative, processor and storage medium may reside as discrete components in a user terminal. Additionally, in some aspects, the acts and/or actions of a method or algorithm may reside as one or any combination or set of codes and/or instructions on a machine-readable medium and/or computer readable medium, which may be incorporated into a computer program product.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A device comprising:
a first antenna element;
angle estimator circuitry configured to:
cause the first antenna element to transmit an omnidirectional pulse;
cause the first antenna element to detect an echo of the transmitted pulse reflected from a second device;
estimate an angle between the device and the second device based at least on a characteristic of the echo; and
cause the device to provide the angle to the second device.

2. The device of claim 1, wherein the omnidirectional pulse comprises discrete coded waveforms.

3. The device of claim 1, further comprising:
a second antenna element to be disposed a first distance from the first antenna element;
wherein the angle estimator circuitry is further configured to:
cause the second antenna element to transmit the omnidirectional pulse simultaneously with the first antenna element;
cause the second antenna element to detect the echo;
estimate a second distance between the first antenna element and the second device;
estimate a third distance between the second antenna element and the second device; and
estimate the angle based on the first distance, the second distance, and the third distance.

4. The device of claim 1, wherein the angle estimator circuitry is configured to detect the echo based on reflection characteristics in a detected signal that indicate that the signal comprises an echo that is reflected from a communication device.

5. The device of claim 1, wherein the angle estimator circuitry is configured to cause another angle estimator circuitry associated with the second device to:
cause an antenna element in the second device to transmit a second omnidirectional pulse;
cause the antenna element in the second device to detect a second echo of the second pulse reflected from the device;
estimate an angle between the device and the second device based at least on a characteristic of the second echo; and
cause the second device to transmit the angle to the device.

6. The device of claim 1, wherein the angle estimator circuitry is configured to:
cause the first antenna element to detect a subsequent echo of the pulse reflected from a third device;
estimate an angle between the device and the third device based at least on a characteristic of the subsequent echo; and
cause the device to transmit the angle to the third device.

7. A method, comprising:
causing an antenna element in a first device to transmit an omnidirectional pulse; and
detecting an echo of the transmitted pulse reflected from a second device;
estimating an angle between the first device and the second device based at least on a characteristic of the echo; and
providing the angle to the second device.

8. The method of claim 7, wherein the omnidirectional pulse comprises discrete coded waveforms transmitted by the first antenna element.

9. The method of claim 7, further comprising:
with a second antenna element to be spaced apart from the first antenna element by a first distance:
transmitting the omnidirectional pulse simultaneously with the first antenna element; and
detecting the echo;
estimating a second distance between the first antenna element and the second device;
estimating a third distance between the second antenna element and the second device; and
estimating the angle based on the first distance, the second distance, and the third distance.

10. The method of claim 7, comprising detecting the echo based on Doppler characteristics in a detected signal that indicate that the detected signal comprises an echo that is reflected from a communication device.

11. The method of claim 7, comprising receiving an acknowledgement signal from the second device indicating that the detected echo is reflected from the second device.

12. The method of claim 7, further comprising:
causing an antenna element in the second device to transmit a second omnidirectional pulse;
causing the antenna element in the second device to detect a second echo of the second pulse reflected from the device;
estimating an angle between the device and the second device based at least on a characteristic of the second echo; and
causing the second device to transmit the angle to the device.

13. The method of claim 7, further comprising:
detecting a subsequent echo of the pulse reflected from a third device;
estimating an angle between the device and the third device based at least on a characteristic of the subsequent echo; and
transmitting the angle to the third device.

14. Non-transitory computer-readable medium having computer-executable instructions stored thereon that, when executed by a computer, cause the computer to:
cause an antenna element in a first device to transmit an omnidirectional pulse; and
detect an echo of the transmitted pulse reflected from a second device;
estimate an angle between the first device and the second device based at least on a characteristic of the echo; and
provide the angle to the second device.

15. The non-transitory computer-readable medium of claim 14, wherein the omnidirectional pulse comprises discrete coded waveforms.

16. The non-transitory computer-readable medium of claim 14, wherein the instructions further comprise instructions configured to cause the computer to:
cause a second antenna element to transmit the omnidirectional pulse simultaneously with the first antenna element, wherein the second antenna element is spaced apart from the first antenna element by a first distance;
cause the second antenna element to detect the echo;
estimate a second distance between the first antenna element and the second device;
estimate a third distance between the second antenna element and the second device; and
estimate the angle based on the first distance, the second distance, and the third distance.

17. The non-transitory computer-readable medium of claim 14, wherein the instructions further comprise instructions configured to cause the computer to detect the echo based on reflection characteristics in a detected signal that indicate that the signal comprises an echo that is reflected from a communication device.

18. The non-transitory computer-readable medium of claim 14, wherein the instructions further comprise instructions configured to cause the computer to cause another computer associated with the second device to:
cause an antenna element in the second device to transmit a second omnidirectional pulse;
cause the antenna element in the second device to detect a second echo of the second pulse reflected from the device;
estimate an angle between the device and the second device based at least on a characteristic of the second echo; and
cause the second device to transmit the angle to the device.

19. The non-transitory computer-readable medium of claim 14, wherein the instructions further comprise instructions configured to cause the computer to:
cause the first antenna element to detect a subsequent echo of the pulse reflected from a third device;
estimate an angle between the device and the third device based at least on a characteristic of the subsequent echo; and
cause the device to transmit the angle to the third device.

20. The non-transitory computer-readable medium of claim 14, wherein the instructions further comprise instructions configured to cause the computer to detect the echo based on Doppler characteristics in a detected signal that indicate that the detected signal comprises an echo that is reflected from a communication device.

* * * * *